United States Patent Office.

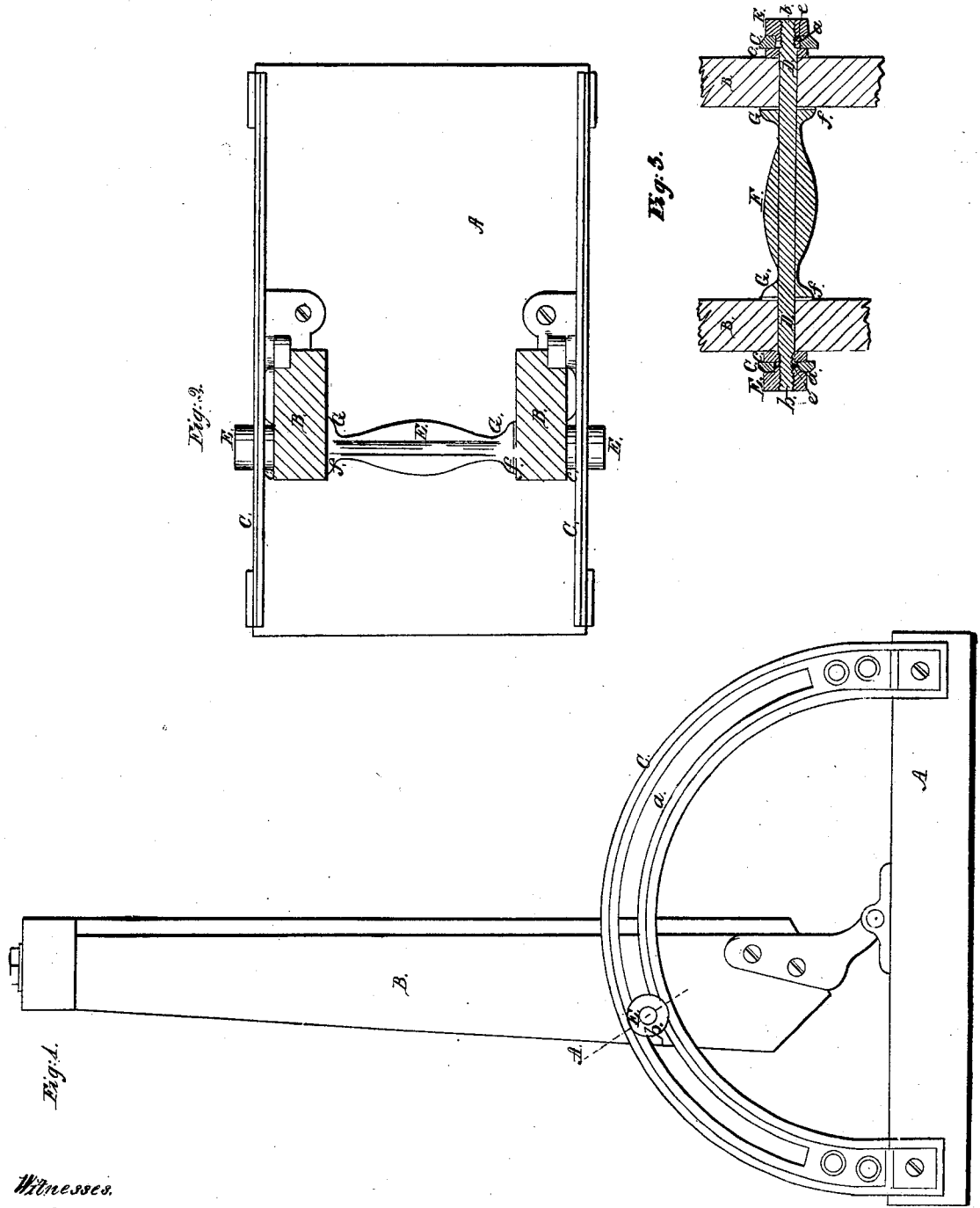

EDWARD J. WORCESTER, OF WORCESTER, MASSACHUSETTS.

Letters Patent No. 110,530, dated December 27, 1870.

IMPROVEMENT IN BORING-MACHINES.

The Schedule referred to in these Letters Patent and making part of the same.

*To all whom it may concern:*

Be it known that I, EDWARD J. WORCESTER, of the city and county of Worcester and Commonwealth of Massachusetts, have invented certain new and useful Improvements in Hand-Boring Machines; and I do hereby declare that the following is a full, clear, and exact description of the same, reference being had to the accompanying drawing forming a part of this specification, in which—

Figure 1 represents a side view of so much of a hand-boring machine as is necessary to illustrate my invention;

Figure 2 represents a plan or top view on line A B, fig. 1; and

Figure 3 represents a section on line A C, fig. 1.

To enable those skilled in the art to which my invention belongs to make and use the same, I will proceed to describe the same more in detail.

In the drawing—

The part marked A is the base of the machine, to which the frame B, which supports the auger, is hinged, as indicated in the drawing, or otherwise, as may be preferred.

C C are the curved rests or supports, having grooves or slots $a\ a$, through which the ends $b\ b$ of the rod D pass, washers $c\ c$ being placed upon the ends of rod D, between the curved supports C and the side-pieces of frame B, as indicated in the drawing.

One end of rod D has a right-hand screw-thread cut thereon and the other end has a left-hand screw-thread cut thereon to receive the nuts E E which have threads cut in them to fit the threads on the ends of rod D.

Nuts E E have flat projections $e\ e$ which fit into the slots $a\ a$ in the pieces C C, whereby nuts E E are kept from turning.

Upon the rod D is cast or otherwise fastened a hand-piece, F, which may be made in any desired form and of any desired size.

Washers $f\ f$ may be placed between the projections or hubs G G of the hand-piece F and the sides of the frame B, if preferred.

The operation is as follows:

When the operator desires to move frame B, to give the auger or bit any desired angle, he takes hold of the hand-piece F and turns it so as to run the nuts E E off until frame B is relieved so that it can be moved to any desired position, the ends $b\ b$ of rod D and the projections $e\ e$ of nuts E E sliding in the slots $a\ a$ of the pieces C C.

After the frame B has been moved to the desired position the operator turns the hand-piece F in a reverse direction, and thus screws nuts E E onto the ends $b\ b$ of rod D, whereby the curved side-pieces C C are forced against the sides of frame B with such force that the parts are clamped securely together, the sides of the frame B being held firm between the side-pieces C C and the shoulders or hubs G G on the hand-piece F.

It will be seen that, by my improvements for holding the frame B in any desired inclination, the adjustment can be made made with ease and in a very expeditious manner, since the operator does not necessarily have to take his hand off of the hand-piece F during the whole operation of adjusting the frame.

In lieu of the nuts E E, bolts with flat shoulders, to fit the grooves or slots $a$, may be employed in combination with a hand-piece, F, only of sufficient length to fit in between the side pieces of frame B, and having holes bored in each end, with screw-threads to receive and fit the threads on the ends of the bolts, one of which bolts should have a right-hand and the other a left-hand thread cut thereon.

I prefer the arrangement shown in the drawing, however.

Having described my improved hand-boring machine,

What I claim therein as new and of my invention, and desire to secure by Letters Patent, is—

The combination, with the frame or upright B and the side-pieces C, of the rod D, provided at its end with right-and-left-hand screw-threads, the hand-piece F, and the nuts E fitting in the slotted pieces C and engaging with the screw-threads with which the ends of rod D are provided, said parts being constructed and operating substantially as shown and set forth.

EDWARD J. WORCESTER.

Witnesses:
 THOS. H. DODGE,
 GEO. H. MILLER.